United States Patent [19]

Marek et al.

[11] 3,997,417
[45] Dec. 14, 1976

[54] PROCESS FOR RADIATION POLYMERIZATION AND COPOLYMERIZATION OF MONOMERS WITH OLEFINIC DOUBLE BONDS USING METAL HALIDE CATALYSTS

[75] Inventors: Miroslav Marek; Ludek Toman; Jan Pecka, all of Prague, Czechoslovakia

[73] Assignee: Ceskoslovenska akademie ved, Prague, Czechoslovakia

[22] Filed: Sept. 28, 1971

[21] Appl. No.: 184,637

Related U.S. Application Data

[63] Continuation-in-part of Ser. No. 133,354, April 12, 1971, abandoned.

[30] Foreign Application Priority Data

Apr. 21, 1970 Czechoslovakia ............... 2712/70
Apr. 22, 1970 Czechoslovakia ............... 2792/70

[52] U.S. Cl. .......................... 204/159.24; 526/170; 526/308; 526/332; 526/334; 526/339; 526/346; 526/347; 526/349; 526/350
[51] Int. Cl.$^2$ ...................... C08F 2/46; C08F 4/00
[58] Field of Search ................ 204/159.24, 159.23, 204/159.15

[56] References Cited
UNITED STATES PATENTS

| | | | |
|---|---|---|---|
| 2,845,414 | 7/1958 | Schutze et al. | 204/159.24 |
| 2,899,414 | 8/1959 | Mertes | 204/159.24 |
| 2,943,987 | 7/1960 | Anderson | 204/159.24 |
| 3,105,024 | 9/1963 | Schutze et al. | 204/159.24 |
| 3,551,235 | 12/1970 | Bassemir et al. | 204/159.15 |

*Primary Examiner*—Richard B. Turer

[57] ABSTRACT

Process for polymerization and copolymerization of momo-olefinic monomers, such as isobutylene, either with one another or with dienes, catalyzed by tetravalent metal halides, and initiated or accelerated by the action of ultraviolet, visible or infrared light. The polymerization or copolymerization can be affected with or without solvent. Suitable solvents are aliphatic, aromatic or halogenated hydrocarbons. The polymerization is carried out at a temperature in a range of from about −140° C. to about +30° C.

10 Claims, No Drawings

PROCESS FOR RADIATION POLYMERIZATION AND COPOLYMERIZATION OF MONOMERS WITH OLEFINIC DOUBLE BONDS USING METAL HALIDE CATALYSTS

BACKGROUND OF THE INVENTION

This application is a continuation-in-part of our copending application, U.S. Ser. No. 133,354 filed Apr. 12, 1971 and entitled, Method Of Polymerization and Copolymerization Of Monomers With Olefinic Double Bonds.

This invention relates to a method of polymerization and copolymerization of monomers. More particularly, the invention relates to the polymerization and copolymerization of mono-olefinic monomers, such as isobutylene, either with one another or with dienes.

Among the many mono-olefinic monomers capable of polymerization and which are widely useful in industry is isobutylene. In known applied technological practice, the polymerization of isobutylene to high molecular weights has usually been catalyzed by aluminium trichloride or by boron trifluoride at low temperatures in a range of from about −80° to −100° Centigrades. In view of the relatively high reaction speed, the polymerizing processes have not been feasible without solvents, especially when employing highly concentrated monomer solutions and the reaction mixture is exposed to undesirable strong overheating by the reaction heat, even when subjected to effective cooling and agitation. Therefore, it is generally advisable to carry out the process with less concentrated solutions containing large volumes of solvents to be recycled and reused. As a consequence, the necessary low temperature of polymerization, as well as the purification of ancillary solvents, increase plant costs and make the actual process of preparing high molecular weight polyisobutylene highly expensive.

Among the best known and useful isobutylene copolymers are the copolymers thereof with isoprene or with butadiene. In present technological practice the copolymerization of isobutylene with isoprene to high molecular weight to produce butyl rubber is effected at low temperatures and in the presence of catalysts such as mentioned above. At higher temperatures there generally is formed copolymers of lower molecular weight which are unsuitable for further processing by curing or vulcanisation. Here again, reaction speed affects the polymerizing process and it cannot be carried out without solvents, especially in highly concentrated monomer solutions, since under these conditions the reaction mixture is exposed to an undesirable extreme overheating even when it is thoroughly cooled and stirred. Therefore, it is generally necessary to operate with lower concentration solutions containing large solvent volumes which are, as used, recycled for purification purposes. The necessary low temperatures of polymerization and the purification of the auxillary solvents again make the costs of plant appliances, as well as the actual process of manufacturing polyisobutylene types of rubber, extremely expensive.

The present invention, however, provides a process which overcomes the aforesaid disadvantages and significantly improves the polymerization and copolymerization of monomers with olefinic double bonds.

The mechanism of such polymerizations is usually considered as cationic. It is to be understood, however, that this invention is not restricted to any theoretical explanation of the reaction mechansim and, therefore, the term "polymerization" is used throughout the specification and in the appended claims.

SUMMARY OF THE INVENTION

In accordance with the invention, there is provided a process for polymerizing mono-olefinic monomers and forming homopolymers and copolymers thereof which comprises subjecting to a source of initiation or acceleration by the action of ultraviolet infrared or visible light a polymerizable mixture selected from the group consisting of (a) at least one mono-olefinic monomer and at least one tetravalent metal halide catalyst, and (b) at least one mono-olefinic monomer, at least one diene and at least one tetravalent metal halide catalyst, bringing the mixture to a temperature in a range of about −140° C. to about +30° C. and maintaining the mixture at a temperature is such range until polymerization is complete.

According to one feature of the invention, there is an improved process of polymerization of mono-olefinic monomers such as isobutylene, either with one another or with dienes which comprises initiating or accelerating the polymerization or copolymerization, respectively, by contacting the reaction mixture containing as catalysts, halides of tetravalent metals, such as titanium, vanadium, or zirconium with a source of ultraviolet or visible or infrared light.

In accordance with another feature of the invention, the polymerization rate is controlled by catalyst dosing and by light intensity, or by alternately switching the light source on and off.

The polymerization can be effected with or without solvents such as aliphatic, aromatic or halogenated hydrocarbons.

DESCRIPTION OF THE PREFERRED EMBODIMENTS

The process according to the present invention enables the polymerization to high molecular weights in a range of about 500 to about $1 \times 10^7$ determined by viscosimetric method of isobutylene to be effected under much more advantageous conditions than those prevailing by wellknown processes. It allows a mono-olefinic monomer to polymerize to a high polymer at a controllable rate, without solvent, and at a relatively high temperature.

It is known to initiate or accelerate polymerization by irradiating monomers capable of free radical polymerization in the presence of peroxide or azo initiators or photosensitive compounds such as benzoin. However, with monomers incapable of free radical polymerization such as isobutylene, there is known no initiating system which can be activated by irradiation.

Now, it has been surprisingly found that even with isobutylene and with unsaturated monomers capable of what is generally referred to as cationic polymerization, the polymerizing process can be initiated or accelerated by the action of light even in dry state, that is, without solvents, and without any addition of co-catalyst, in the presence of halides of tetravalent titanium, vanadium or zirconium catalysts. Simultaneously, it has been found that the polymerizing process catalyzed by vanadium tetrachloride proceeds very slowly in the dark but is considerably accelerated if exposed to daylight, or if subjected to the light of an electric bulb, a mercury discharge lamp or an infrared lamp. On the other hand, the polymerizing process catalyzed by titanium halides does not begin to proceed until the reaction mixture is subjected to light from the mentioned sources, the polymerization rates exhibiting the following sequence: $TiCl_4 < TiBr_4 < TiI_4$. By switching off the light, the reactions slowly fade out and by switching it on again they accelerate in all the cases where titanium, vanadium and zirconium halides are used as catalysts. In general, the polymerization rate depends upon the concentration of the respective catalyst as well as on the intensity of the applied light, i.e. ultraviolet, visible and infrared light. By a suitable dosing of the catalyst and control of the light intensity, or by alternately switching the light source on and off, the polymerization rate can be controlled so that it proceeds within a narrow temperature range following practically an isothermal course. The aforesaid procedures enable the polymerization to be effected without any solvent under isothermal conditions. The maintenance of almost isothermal conditions contributes to obtaining polymers having a narrower or more uniform distribution of molecular weights. If the molecular weight of the polymer being formed is sufficiently high, the polymer separates from the monomer solution when the polymerization is carried out without a solvent. The reaction mixture is of pulpy character and can be easily stirred and cooled even at relatively high conversion rates, i.e. conversion rates of about 30 percent.

In case of solvent polymerization, aliphatic, aromatic or chlorinated hydrocarbons can be used as solvents. Examples of such solvents are n-heptane, petroleum-ether, toluene, $CCl_4$ and the like.

When preparing a copolymer with a diene in accordance with the invention, the process is carried out in a like.

When preparing a copolymer with a diene in accordance with the invention, the process is carried out in a like manner. Copolymers having molecular weight of conventional butyl rubber can be obtained with the process at temperatures in a range of from about −20° C. to about −40° C. The unsaturation value of the co-polymers varies, being dependent on the composition of the starting mixture. Even at a relatively high unsaturation value, such as of about 3 percent, and with a sufficiently high molecular weight, the copolymers are fairly soluble in organic solvents. Apart from butadiene and isoprene, isobutylene can be advantageously copolymerized also with 2, 3-dimethylbutadiene -1,3,piperylene, cyclohexadiene, alkoxybutadiene, chloroprene and 2,5-dimethyl-1,5-hexadiene (dimethallyl). Additional dienes which can be useful includes 1,4-hexadiene, dicyclopentadiene, 1,4-dimethylbutadiene-1,3 and the like.

In carrying out the process of this invention, the catalyst can be employed in widely varying amounts. At least enough catalyst should be present to bring about the reaction. Generally, however, the catalyst is employed in a molar ratio of $1 \times 10^{-4}$ to $5 \times 10^{-3}$ moles of catalyst to 1 to 5 moles of reactant and/or reactants and preferably $3 \times 10^{-4}$ to $1 \times 10^{-3}$ moles of catalyst to 1 to 2 moles of reactant and/or ractants.

The following examples are given as illustrative only and it is to be understood are not limitative in nature.

EXAMPLE I

Isobutylene was subjected to block polymerization in a glass reactor in the absence of a solvent and under an argon atmosphere in accordance with the following procedure, the reaction misture having been steadily agitated by means of a magnetic stirrer. The reactor was filled with 25 grams of isobutylene of 99.2 percent purity and after cooling to 40° C. below zero, $1 \times 10^{-4}$ mole of titanium tetrachloride in an n-heptane solution was added to the reaction misture. Polymerization was initiated with a mercury discharge lamp (250 Watt) with consequent temperature and viscosity increases of the medium. In order to keep the temperature within the range of from 40° to 38° Centigrades below zero, the irradiation was applied intermittently as required. After one hour, the reaction was stopped by adding alcohol. A 30 percent conversion to polymer was obtained. The molecular weight of the polymer, measured by the method mentioned above, was 130.000.

EXAMPLE II

Isobutylene was subjected to solventless polymerization in the same manner as referred to in EXAMPLE I except that instead of titanium tetrachloride, titanium tetraiodide was used as catalyst. After a short period of contact of the reactor with a mercury discharge lamp, a rapid polymerization started. This was followed by separation of the forming polymer from the monomer solution, while the polymerizing process slowly faded out. To restore it, the reactor was subjected to the light of an ordinary electric light source (100 Watt bulb) by alternately switching it on and off in order to maintain the reaction temperature within the range of from 40° to 38° Centigrades below zero. A 45 percent conversion was attained within a 30 minute period, the molecular weight of the polymer amounted to 450.000 in comparison to the molecular weight of a polymer prepared at the temperature of 78° C. below zero which was $2 \times 10^6$.

EXAMPLE III

Isobutylene was subjected to solventless polymerization as in EXAMPLE I, being catalysed by $1.2 \times 10^{-4}$ mole of vanadium tetrachloride and subjected to the light of an electric bulb (200 Watt). The polymerization proceeded to 45 percent conversion within one hour. The polymer was being continuously precipitated from the monomer solution. The molecular weight of the polymer prepared at the temperature of 40° C. below zero was 230.000 determined by viscosimetric method.

EXAMPLE IV

A 30 percent by weight styrene solution in n-heptane was subjected to polymerization in a glass reactor at a temperature of 50° C. below zero. The polymerication was catalysed by vanadium tetrachloride and subjected to the light of an ordinary electric bulb (200 Watt). The forming polystyrene was continuously precipitated out of the n-heptane solution in the form of fine powder. The catalyst was added in small doses as a 0.3 mole solution in n-heptane and total consumption amounted to $2 \times 10^{-4}$ mole per 100 grams of 30 percent monomer solution. The polymerization was finished within a 1 hour period and an 85 percent conversion to polymer was obtained.

EXAMPLE V

A 30 percent by weight monomaric isobutylvinylether was subjected to polymerization at a temperature of 30° C. below zero. To 25 grams of the solution, $0.1 \times 10^{-4}$ mole of titanium tetraiodide was added and the solution was subjected to the light of a mercury discharge lamp. The polymer precipitated out of the solution during the polymerization. The reaction proceeded in a one hour period to 100 percent conversion to polymer of which intrinsic viscosity amounted to 0.95.

EXAMPLE VI

A 30 percent by weight isobutylene solution in methylenechloride was subjected to polymerization at a temperature of 30° C. below zero as follows: To 40 grams of isobutylene solution, $0.2 \times 10^{-4}$ mole of titanium tetrabromide were added and the solution was subjected for 1 hour to a mercury discharge lamp. The polymerization proceeded up to 90 percent conversion and the forming polymer similtaneously precipitated from the solution. The molecular weight of the polyisobutylene obtained was 150.000 determined by viscosimetric method.

EXAMPLE VII

A 30 percent by weight isobutylene solution in toluene was subjected to polymerization at a temperature of −10° C. while the solution was subjected to a mercury discharge lamp (250 Watts) in accordance with the following procedure: To 30 grams of the solution, $0.1 \times 10^{-3}$ mole of titanium tetraiodide was added and the solution was irradiated for 45 minutes. The polymerization proceeded to 100 percent conversion and the molecular weight of the polymer obtained equalled to 110.000 determined by viscosimetric method.

EXAMPLE VIII

Isobutylene and styrene were subjected to copolymerization at 40° C. below zero without any solvent according to the following procedure: The copolymerization was catalysed by vanadium tetrachloride and initiated by an electric bulb (200 Watts). To the mixture of 25 grams of isobutylene and 5 grams of styrene there was added $1.5 \times 10^{-4}$ mole of vanadium tetrachloride. During the polymerization, the forming copolymer was continuously precipitated from the solution of the monomers. The copolymerization was finished after a 1.5 hour period. There were obtained 12 grams of copolymer having a molecular weight of 75.000.

EXAMPLE IX

Isobutylene and isobutylvinylether in the absence of a solvent were subjected to copolymerization at 40° C. below zero and catalysed by titanium tetraiodide and initiated with a mercury discharge lamp in accordance with the following procedure: To a mixture of the monomers containing 25 grams of isobutylene and 5 grams of isobutylvinylether, $0.1 \times 10^{-3}$ mole of catalyst was added. After a one hour period, the copolymerization was finished and 10 grams of copolymer were obtained having a molecular weight of 134.000 as determined by viscosimetric method.

EXAMPLE X

Five grams of alpha-methylstyrene and 5 grams of isobutylvinylether were subjected to copolymerization with 30 grams of heptane solution according to the following procedure: At the temperature of 40° C. below zero, there was added $0.1 \times 10^{-3}$ mole of titanium tetraiodide catalyst, and the solution was subjected to a mercury lamp (250 Watt). During the polymerization, the copolymer continuously precipitated from the solution. After a one hour period, the copolymerization was complete. The yield was 6 grams of copolymer having an intrinsic viscosity of 0.65.

EXAMPLE XI

Isobutylene and butadiene were subjected to copolymerziation in a glass reactor in the absence of a solvent under an atmosphere of argon and free of oxygen in accordance with the following procedure, the reaction mixture being continuously agitated by means of a magnetic stirrer. The reactor was filled with 35 grams of isobutylene of 99.2 percent purity and with 8 grams of butadiene. After cooling to 40° C. below zero, $1 \times 10^{-4}$ mole of titanium tetrachloride in an n-heptane solution was added to the reaction mixture. The copolymerization started when the reactor was subjected to a mercury discharge lamp (250 Watt). The temperature rose and the polymer began to precipitate out of the solution. In order to keep the temperature within the range of from 40° to 38° Centigrades below zero and the temperature of cooling bath at 45° C. below zero, the light of the mercury discharge lamp was intermittently applied. After 1 hour the polymerization was stopped. The yield was 12 grams of product containing 10 percent of insoluble gel. Molecular weight of the soluble portion which was determined by viscosimetric method was 350.000 and the unsaturation 1.8 percent.

EXAMPLE XII

Isobutylene was subjected to copolymerization as described in EXAMPLE XI, except that instead of butadiene, one gram of isoprene was used. The copolymer obtained contained 15 percent of gel at a 50 percent conversion level of the starting isobutylene. The molecular weight of the soluble portion was 330.000 determined by viscosimetric method. The unsaturation was 1.5 percent.

EXAMPLE XIII

Isobutylene and butadiene were subjected to copolymerization under the same conditions as referred to in EXAMPLE XI, except that titanium tetraiodide as a catalyst was used. The obtained copolymer had a molecular weight of 280.000 determined by viscosimetric method at a 45 percent conversion of the isobutylene.

EXAMPLE XIV

Isobutylene and butadiene were subjected to copolymerization in a glass reactor provided with a magnetic sitrrer. The copolymerization was carried out without any ancillary solvent at the temperature of 40° C. below zero and catalysed by vanadium tetrachloride. Butadiene of 99.2 percent purity was used and the catalyst was dosed as 0.3 mole solution of vanadium tetrachloride in n-heptane in accordance with the following procedure: Into the reactor they were condensed, under an argon atmosphere, 130 grams of isobutylene and 58 grams of butadiene. After adding, $1.1 \times 10^{-3}$ mole of vanadium tetrachloride, the reaction mixture was subjected to the light of two electric bulbs (200 Watts each) and after 1½ hours the copolymerization was inhibited by shutting off the bulbs unit 32 percent conversion was attained. There was obtained a copolymer which was fully soluble in organic solvents and which had a molecular weight of 400.000. The unsaturation value was 2.2 percent. The obtained copolymer was fairly curable by means of conventional curing agents used for vulcanisation of butyl rubber.

EXAMPLE XV

Isobutylene and isoprene were subjected to copolymerization in a glass reactor provided with a magnetic stirrer. The copolymerization was carried out without any ancillary solvent and catalysed by 0.3 mole solution of vanadium tetrachloride in heptane, as referred to in EXAMPLE XIV in accordance with the following procedure: Into the reactor there were condensed, under an argon atmosphere, 25 grams of isobutylene and 0.5 gram of isoprne. After adding $1.6 \times 10^{-4}$ mole of vanadium tetrachloride, the reaction mixture was subjected at a temperature of 40° C. below zero to an electric bulb (200 Watt) for one hour and inhibited by shutting off the bulb of 40 percent conversion. The obtained copolymer had a molecular weight of 250.000 and 1.1 percent unsaturation.

EXAMPLE XVI

Isobutylene was subjected to copolymerization as in EXAMPLE XI, except that instead of butadiene, 5 grams of piperylene were empolyed. The obtained copolymer had a molecular weight of 360.000 at 40 percent conversion level of butylene determined by viscosimetric method.

EXAMPLE XVII

Isobutylene and butadiene were subjected to copolymerization at 40° C. below zero in a solution of N-heptane which was catalysed by titanium tetraiodide and initiated with a mercury discharge lamp according to the following procedure: The reactor was filled with 30 grams of a solution containing 10 grams of isobutylene and 3 grams of butadiene, to which $2 \times 10^{-4}$ mole of the catalyst was added. The copolymerization was finished after a two hour period, i.e. after 80 percent conversion had been attained. The molecular weight of the copolymer was 230.000 determined by viscosimetric method.

EXAMPLE XVIII

Thirty grams of monomeric solution of tetrachlormethane containing 10 grams of isobutylene and 3 grams of butadiene were subjected to copolymerization at a temperature of 40° C. below zero. The copolymerization was catalysed by the adding of $2 \times 10^{-4}$ mole of vanadium tetrachloride and carried out in an argon atmosphere with the reactor being subjected to an electric bulb (200 Watts) for two hours. There was an 80 percent conversion of the isobutylene and the molecular weight of the copolymer amounted to 180.000 determined by viscosimetric method.

EXAMPLE XX

Isobutylene and isoprene were subjected to copolymerization in a toluene solution at the temperature of 50° C. below zero under an argon atmosphere and catalysed by titanium tetrabromide. The glass reactor was filled with 50 grams of a solution containing 15 grams of isobutylene and 0.5 gram of isoprene. Then $2 \times 10^{-4}$ mole of titanium bromide were added and the reaction was initiated with a mercury lamp. After two hours, the copolymerization was completed. The yield amounted to 14 grams of the copolymer having a molecular weight of 310.000 determined by viscosimetric method and an unsaturation value of 1.5 percent.

EXAMPLE XXII

A mixture containing 25 grams of isobutylene and 3 grams of cyclopentadiene was subjected to copolymerization in the presence of $1.2 \times 10^{-3}$ mole of vanadium tetrachloride and subjected to the light of an electric bulb (200 Watts) at the temperature of 30° C. below zero. The resulting copolymer was continuously precipitated from the monomer solution. At the 45 percent conversion level of isobutylene, which was attained within one hour, the molecular weight of the copolymer equalled to 550.000 determined by viscosimetric method.

EXAMPLE XXIII

A monomer mixture containing 25 grams of isobutylene and 3 grams of 2,3-dimethyl-butadiene-1,3 was subjected to copolymerization catalysed by $1.2 \times 10^{-4}$ mole of vanadium tetrachloride and accelerated with an electric bulb (200 Watts) at a temperature of 20° C. below zero. After 1 hour the copolymerization was completed and the yield was 11 grams of copolymer having a molecular weight of 150.000 determined by viscosimetric method and an unsaturation value of 1.1 percent.

EXAMPLE XXIV

Isobutylene and isoprene were subjected to copolymerization in a methylenechloride solution at a temperature of 40° C. below zero in the presence of vanadium tetrachloride and subjection to the light of an electric bulb (200 Watts). For the copolymerization there were used 50 grams of a solution containing 20 grams of isobutylene, one gram of isoprene and $1.5 \times 10^{-4}$ mole of vanadium tetrachloride. After a 45 minute copolymerization period, 18 grams of the copolymer, of which had a molecular weight of 230.000 determined by viscosimetric method, were obtained.

EXAMPLE XXV

Isobutylene was subjected to polymerization without any ancillary solvent, initiated by vanadium tetrachloride and by light. To 25 grams of the monomer cooled to 40° C. below zero and shielded from external light there was added $5 \times 10^{-5}$ mole of vanadium tetrabromide in toluene solution. The polymerizing process did not start in the dark and was initiated when the reaction mixture was subjected to the light of an electric bulb (200 Watts). After 30 minutes the polymerization amounted to 10 grams of the polymer having molecular weight of 230.000 determined by viscosimetric method. In a similar manner, a polymerization which was catalysed by vanadium tetraiodide was carried out. Under the same conditions as referred to in connection with vanadium tetrabromide catalyst, there were obtained after 30 minutes polymerization 8 grams of the polymer having molecular weight of 210.000 determined by viscosimetric method.

EXAMPLE XXVI

Isobutylene was copolymerized with chloroprene at −78° C. without any solvent. The monomer mixture contained 22 g of isobutylene and 4.4 grams of chloroprene. As catalyst there was added $1.8 \times 10^{-4}$ mole of vanadium tetrachloride. The mixture was then subjected for 5 seconds to a 500 Watt electric bulb and after 30 minutes the polymerization was completed by adding ethyl alcohol. The conversion level was 42%.

The average molecular weight amounted to 300.000 determined by viscosimetric method. The copolymer thus obtained was soluble in organic solvents. It contained 2.48% of chlorine and 1.7% of double bonds.

The foregoing fully reveals the present invention and many variations of the invention can be made in the generic or specific aspects of this invention without departing from the spirit and scope thereof, and the invention is not to be limited except as defined in the appended claims.

What is claimed is:

1. A process for polymerizing mono-olefinic monomers and forming homopolymers and copolymers thereof comprising subjecting to a source of light selected from the group consisting of ultraviolet, infrared and visible light a polymerizable mixture selected from the group consisting of (a) at least one mono-olefinic monomer selected from the group consisting of isobutylene, styrene, isobutyvinylether and α-methylstyrene and at least one tetravalent metal halide catalyst, and (b) at least one mono-olefinic monomer selected from the group in (a), at least one diene selected from the group consisting of butadiene, isoprene, 2,3 - dimethylbutadiene -1,3 and chloroprene and at least one tetravalent metal halide catalyst selected from the group consisting of zirconium the halides of titanium and vanadium, bringing the mixture to a temperature in a range of about −140° C. to about +30° C. and maintaining the mixture at a temperature in such range until polymerization is complete.

2. A process as defined in claim 1 wherein the polymerizable mixture comprises isobutylene and a tetravalent metal halide catalyst.

3. A process as defined in claim 1 wherein the polymerizable mixture comprises isobutylene, butadiene and a tetravalent metal halide catalyst.

4. A process as defined in claim 1 wherein the polymerization is controlled by varying the intensity of the light and varying the amount of catalyst.

5. A process as defined in claim 1 wherein the polymerization is controlled by alternately switching the light switch on and off.

6. A process as defined in claim 1 wherein the polymerizable mixture is disolved in a solvent therefor.

7. A process as defined in claim 6 wherein the solvent is selected from the group consisting of aliphatic, aromatic and halogenated hydrocarbons.

8. A process as defined in claim 1 wherein the source of light is ultraviolet light.

9. A process as defined in claim 1 wherein the source of light is infrared light.

10. A process as defined in claim 1 wherein the source of light is visible light.

* * * * *